US012661952B2

(12) United States Patent
Patel et al.

(10) Patent No.: US 12,661,952 B2
(45) Date of Patent: Jun. 23, 2026

(54) METHOD, SYSTEM, AND TECHNOLOGY FOR PRECONDITIONING A VEHICLE INTERIOR

(71) Applicant: Daimler Truck North America LLC, Portland, OR (US)

(72) Inventors: Umang Patel, Happy Valley, OR (US); Scott Matsuo, Portland, OR (US)

(73) Assignee: Daimler Truck North America LLC, Portland, OR (US)

( * ) Notice: Subject to any disclaimer, the term of this patent is extended or adjusted under 35 U.S.C. 154(b) by 446 days.

(21) Appl. No.: 18/119,409

(22) Filed: Mar. 9, 2023

(65) Prior Publication Data

US 2023/0286353 A1     Sep. 14, 2023

Related U.S. Application Data

(60) Provisional application No. 63/318,103, filed on Mar. 9, 2022.

(51) Int. Cl.
B60H 1/00          (2006.01)

(52) U.S. Cl.
CPC ..... B60H 1/00778 (2013.01); B60H 1/00392 (2013.01)

(58) Field of Classification Search
None
See application file for complete search history.

(56) References Cited

U.S. PATENT DOCUMENTS

| | | | |
|---|---|---|---|
| 6,304,803 B1 | 10/2001 | Dao | |
| 6,672,085 B1 * | 1/2004 | Sangwan | B60H 1/008 |
| | | | 62/133 |
| 7,441,414 B2 | 10/2008 | Ziehr et al. | |
| 8,527,114 B2 | 9/2013 | Ferguson et al. | |
| 8,565,969 B2 | 10/2013 | Bradley et al. | |
| 9,463,700 B2 * | 10/2016 | Liu | B60L 58/12 |
| 9,862,246 B2 * | 1/2018 | Kikuchi | B60H 1/00742 |
| 9,950,638 B2 | 4/2018 | Porras et al. | |
| 10,118,461 B2 | 11/2018 | Sutherland et al. | |
| 10,293,654 B2 | 5/2019 | Treharne et al. | |
| 10,611,211 B2 * | 4/2020 | Lee | B60H 1/00778 |

(Continued)

FOREIGN PATENT DOCUMENTS

| | | | |
|---|---|---|---|
| DE | 102009019607 A1 * | 11/2010 | B60H 1/00492 |
| DE | 102016209621 A1 | 12/2016 | |

(Continued)

*Primary Examiner* — Jenna M Maroney
(74) *Attorney, Agent, or Firm* — ArentFox Schiff LLP

(57)          ABSTRACT

Methods, systems, and technologies for preconditioning an interior/cabin of a vehicle using a control system and an HVAC system. The preconditioning can include heating or cooling the interior/cabin to a desired temperature or temperature range, and/or maintaining the interior/cabin at the desired temperature or temperature range once reached, e.g., prior to departure/operation of an associated vehicle. The preconditioning can be initiated and/or controlled based on an estimated or selected departure time, and/or can be performed in multiple phases that use different operation of the HVAC system to manage heat transfer and power use. The preconditioning can also be adjusted based on a rate of battery charging to facilitate a desired battery charge prior to departure.

21 Claims, 8 Drawing Sheets

(56) References Cited

U.S. PATENT DOCUMENTS

| | | | | |
|---|---|---|---|---|
| 2010/0132388 | A1* | 6/2010 | Oyobe | B60L 1/02 |
| | | | | 62/157 |
| 2010/0222929 | A1 | 9/2010 | Ostermeier et al. | |
| 2011/0118919 | A1* | 5/2011 | Park | B60L 1/04 |
| | | | | 701/22 |
| 2012/0234930 | A1 | 9/2012 | Wijaya | |
| 2013/0271074 | A1 | 10/2013 | Federico et al. | |
| 2014/0039735 | A1* | 2/2014 | Major | B60L 58/26 |
| | | | | 320/155 |
| 2014/0277869 | A1 | 9/2014 | King et al. | |
| 2015/0258998 | A1* | 9/2015 | Kusumi | B60L 53/665 |
| | | | | 701/22 |
| 2016/0026659 | A1 | 1/2016 | Harley et al. | |
| 2016/0207375 | A1 | 7/2016 | Gauthier et al. | |
| 2016/0355068 | A1* | 12/2016 | Sutherland | B60L 53/302 |
| 2017/0008375 | A1 | 1/2017 | Blatchley et al. | |
| 2018/0272878 | A1* | 9/2018 | Lee | B60L 53/665 |
| 2018/0334170 | A1* | 11/2018 | Liu | B60W 10/30 |
| 2020/0369113 | A1* | 11/2020 | Shrivastava | B60H 1/00257 |
| 2021/0008963 | A1* | 1/2021 | Takizawa | H02J 7/0071 |
| 2022/0088999 | A1* | 3/2022 | Hoshino | B60H 1/3222 |
| 2022/0224119 | A1* | 7/2022 | Badger | B60H 1/00735 |
| 2022/0305941 | A1* | 9/2022 | Telpaz | H02J 7/0048 |

FOREIGN PATENT DOCUMENTS

| | | | | | |
|---|---|---|---|---|---|
| DE | 102016111791 | A1 | * | 1/2017 | B60H 1/00278 |
| EP | 2679418 | A1 | | 1/2014 | |
| JP | 2001105839 | A | | 4/2001 | |
| JP | 2009083567 | A | * | 4/2009 | B60L 1/003 |
| JP | 2011073657 | A | * | 4/2011 | |
| JP | 2021020540 | A | * | 2/2021 | |
| JP | 2024041190 | A | * | 3/2024 | |
| KR | 10-2012-0062443 | A1 | | 6/2012 | |
| WO | WO-2014022026 | A2 | * | 2/2014 | B60L 53/11 |
| WO | WO-2022156968 | A1 | * | 7/2022 | B60H 1/00278 |

* cited by examiner

700

710

OBTAINING, BY A CONTROL SYSTEM, AN AMBIENT TEMPERATURE ASSOCIATED WITH AN ELECTRIC VEHICLE

720

SENDING, BY THE CONTROL SYSTEM, A SIGNAL TO OVERRIDE A CURRENT SETTING OF AN HVAC SYSTEM BASED AT LEAST IN PART ON THE AMBIENT TEMPERATURE

730

INITIATING, BY THE CONTROL SYSTEM, PRE-CONDITIONING OF THE INTERIOR OF THE ELECTRIC VEHICLE USING THE HVAC SYSTEM

800

810

CONFIGURING A CONTROL SYSTEM TO RECEIVE AN INDICATION OF A DEPARTURE TIME, SEND A SIGNAL TO AN HVAC SYSTEM TO OVERRIDE A CURRENT SETTING OF THE HVAC SYSTEM BASED AT LEAST IN PART ON THE INDICATION OF THE DEPARTURE TIME, AND OPERATE THE HVAC SYSTEM TO PRE-CONDITION AN INTERIOR TO A DESIRED TEMPERATURE OR TEMPERATURE RANGE BY THE DEPARTURE TIME

METHOD, SYSTEM, AND TECHNOLOGY FOR PRECONDITIONING A VEHICLE INTERIOR

CROSS-REFERENCE TO RELATED APPLICATIONS AND PRIORITY CLAIM

This non-provisional patent application claims priority to U.S. provisional patent app. No. 63/318,103, filed on Mar. 9, 2022, and titled "METHOD AND SYSTEM FOR PRE-CONDITIONING CABIN OF ELECTRIC VEHICLE," the contents of which is incorporated herein by reference in the entirety.

TECHNICAL FIELD

The field relates to vehicles equipped with an onboard energy source capable of being charged, and efficient energy usage and energy management of such vehicles.

BACKGROUND

Traditional vehicles, such as commercial trucks, are equipped with a heating, ventilation and air-conditioning (hereinafter "HVAC") system that can control and/or maintain the temperature of an interior (e.g., cabin) of the vehicle. Electric vehicles, including commercial electric vehicles, such as trucks, are now becoming more-widely available. When not in operation, electric vehicles are often coupled to a charging station to restore the battery charge in the electric vehicle. It is often the case that an ambient temperature associated with an electric vehicle may cause the interior of the electric vehicle to be outside of a comfortable temperature range for an operator (such as being too cold, or too hot). Also, if the ambient temperature is low, and the electric vehicle is outside, the windshields and windows may be obscured by ice, snow or frost upon operation of the electric vehicle.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, methods, systems, and technologies for preconditioning the interior of a vehicle, e.g., such as an electric vehicle, among others. The methods, systems, and technologies for preconditioning the interior of a vehicle described herein can be implemented in different circumstances to better control climate conditions, manage power use, manage battery charging, and/or streamline operation of an electric vehicle and/or fleet of electric vehicles in particular.

In one embodiment, preconditioning can be used to provide a desired temperature or temperature range inside a vehicle prior to operation/departure of the vehicle. In embodiments, preconditioning as herein disclosed can be used during a process of charging an onboard energy storage device that is used, at least in part, to propel an electric vehicle. In embodiments, preconditioning can be initiated, controlled, and/or adjusted based on particular parameters. To provide an example, preconditioning can be initiated, controlled, and/or adjusted based on a (e.g., estimated or calculated) time required to precondition a vehicle interior to a particular temperature or temperature range (e.g., according to an ambient temperature and/or based on different operational settings and capabilities of an associated HVAC system). In embodiments, by initiating preconditioning during charging, range of the vehicle is increased as energy used to acclimatize the cabin is drawn while charging as opposed to over the road, or following charging of the onboard energy storage device (e.g., battery) to some predetermined level. In embodiments, preconditioning can be initiated, controlled, and/or adjusted based on a (e.g., estimated, selected, or standardized) departure time of the vehicle (e.g., as determined by an operator, a control system, or a charging process). In embodiments, preconditioning can be initiated, controlled, and/or adjusted based on a battery charging process that is in use (e.g., a duration and/or intensity of preconditioning can be increased or decreased based on the time and/or power required for charging a battery assembly using a particular charging method). In embodiments, preconditioning can be performed in different phases (e.g., multiple phases with distinct operating parameters) to align with particular operational circumstances or changes. For example, a preconditioning process can include an initial phase (e.g., that operates an HVAC system at higher or maximum output for faster heat transfer) and/or one or more subsequent phases (e.g., that operate the HVAC system at a reduced or minimum output to reduce power use that can instead be used for battery charging), or alternatively, a preconditioning process can include an initial phase (e.g., that operates an HVAC system at a lower or minimum output for reduced power use and faster battery charging) and can include one or more subsequent phases (e.g., that operate the HVAC system at a higher or maximum output for faster preconditioning when battery charging parameters are satisfied or are determined will be satisfied based on the charging speed and time available to charge, e.g., prior to departure).

The embodiments herein enable an interior (e.g., cabin or passenger compartment) of a vehicle to be preconditioned to a desired temperature or temperature range by a designated departure time, and in addition, do so in balance with the needs of battery charging (e.g., so that a desired battery charge can be reached in a similar period of time). The embodiments herein additionally allow preconditioning and battery charging to be balanced, e.g., so that preconditioning, battery charging, or both can be maximized in a given period of time based on available capabilities. The embodiments described herein can produce a more comfortable operating environment for an operator in a vehicle interior/cabin, can increase the efficiency and adaptability of battery charging and preconditioning processes, and can reduce unnecessary energy consumption and lost time, among other benefits.

BRIEF DESCRIPTION OF THE DRAWINGS

Embodiments herein are directed to methods, systems, and technologies for preconditioning an interior/cabin of a vehicle, e.g., such as an electric vehicle, without adversely impacting range of the vehicle, are described in detail below with reference to the attached drawings figures which illustrate non-limiting examples of the disclosed subject matter, wherein.

DETAILED DESCRIPTION

Figure 1:
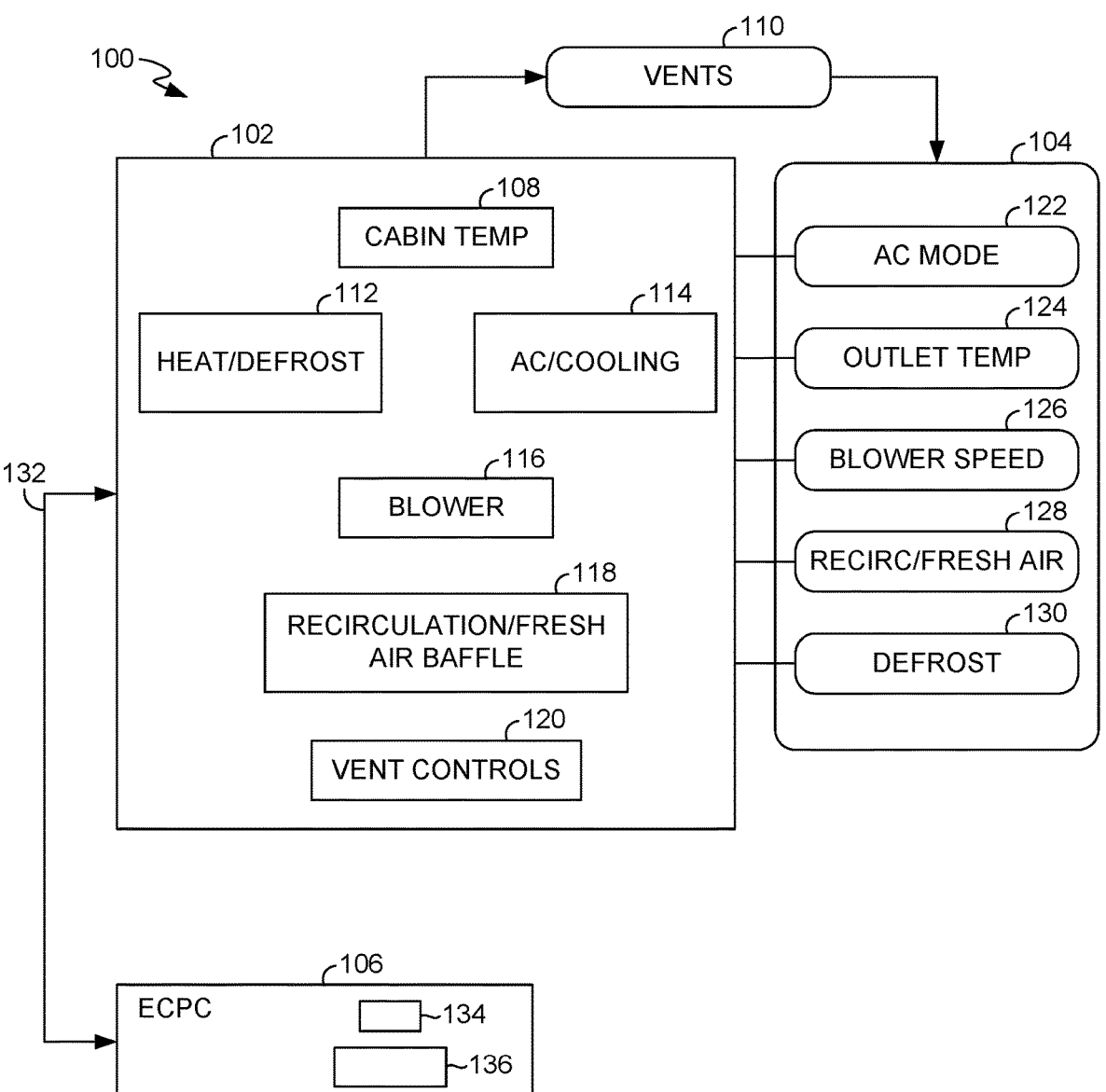
FIG. 1 depicts a schematic view of components of an HVAC system and a control system in the form of an electric central powertrain control, in accordance with embodiments of the present disclosure.

The subject matter of the present invention is described with specificity herein to meet statutory requirements. However, the description itself is not intended to limit the scope of the invention. Rather, it is contemplated that the claimed or disclosed subject matter might also be embodied in other ways, to include different steps, combinations of steps, different elements, and/or different combinations of elements, similar to the ones described in this disclosure, and in conjunction with other present or future technologies or solutions.

In general, disclosed herein are methods, systems, and technologies for preconditioning the interior/cabin of a vehicle using an HVAC system. In embodiments, the vehicle is an electric vehicle. In embodiments, the preconditioning is initiating during charging of an onboard energy storage device (e.g., battery), and the preconditioning is conducted in a manner so as to not adversely impact a range of the vehicle. The preconditioning can include heating or cooling the interior/cabin to a desired temperature or temperature range, and/or maintaining the interior/cabin at the desired temperature or temperature range once reached, e.g., prior to departure/operation of the associated vehicle. The preconditioning can also be performed in balance with the requirements or limitations of battery charging, e.g., to allow a desired battery charge to be reached over a certain period of time by adjusting/modifying the preconditioning process.

In some embodiments, preconditioning can be initiated based on a vehicle departure time (e.g., that is estimated, selected, calculated, or standardized). This allows preconditioning to be performed with a sufficient duration and intensity to allow a desired temperature or temperature range to be reached at the departure time (e.g., by effecting an overall level of heat-transfer needed in the time available), while simultaneously minimizing the amount of energy supplied to the battery to both conduct the preconditioning routine and to charge the battery to a desired charge level. Said another way, based on a departure time, it may be determined when to initiate a preconditioning routine such that both the desired cabin temperature or temperature range and the desired charge level of the battery are achieved without using more energy than necessary to achieve both ends. For example, if preconditioning were initiated too early, then the desired cabin temperature (or temperature range) may be reached prior to departure, and hence may have to be maintained for some duration. This may in turn use more energy, and adversely impact the battery charging process, which may adversely impact a range of the vehicle (i.e., the battery may not be adequately charged in the particular time frame prior to departure, because too much energy is being used for the preconditioning routine. Accordingly, the preconditioning may be initiated and/or adjusted based on the needs of battery charging so that the preconditioning process can be performed while still allowing a desired battery charge to be obtained with a particular charging method (e.g., slow, medium, or fast charging, or a combination thereof) over a particular period of time (e.g., an available duration of battery charging and/or time to departure).

In some embodiments, preconditioning can be conducted by overriding (e.g., resetting, changing, or initiating a reconfiguration of) existing HVAC settings to operate the HVAC system to produce sufficient heat transfer to allow the interior/cabin to reach a desired temperature or temperature range in the time available (e.g., by the departure time), without adversely impacting a range of the vehicle, and by minimizing an amount of energy supplied to the battery to both conduct the preconditioning routine and charge the battery to a desired charge level. The preconditioning can be initiated and/or controlled by an operator and/or by a computer system, and departure time can be input by an operator or by a control system including one that is local or remote (e.g., such as one associated with a fleet management system in communication with multiple electric vehicles).

In some embodiments, the intensity of preconditioning (e.g., the rate of heat transfer effected by the HVAC system and thus the power consumed) can be increased or decreased based on a time determined to be needed to reach a desired level of charge of a battery system (e.g., such as at least 50%, 60%, 70%, 80%, or at least 90% charge, or 100% charge) and/or based on a designated departure time. For example, if charging a battery system to a desired level of charge by a time of departure is not possible using a current charging method along with preconditioning, the intensity of the preconditioning can be reduced by an amount that allows the battery system to reach the desired level of charge by the time of departure, and then can be increased if additional time becomes available (e.g., due to a delay in departure) to help reach or maintain a desired temperature or temperature range.

In some embodiments, preconditioning can be performed in multiple phases during which the HVAC system is operated with different outputs, settings, and/or parameters. To provide one example, during a preconditioning process, an initial phase that is associated with a higher or maximum output of the HVAC system can be used to help reach a desired temperature or temperature range as quickly as possible, e.g., at least by an estimated time of departure, and then one or more subsequent phases that are associated with a reduced or minimum output of the HVAC system can be used to maintain the temperature or temperature range while limiting/reducing power consumption. In such instances, the limiting of power consumption by the HVAC system can be used to accelerate a speed of charging a battery system and/or reduce the overall energy used during a charging/preconditioning process. To provide another example, during a preconditioning process, an initial phase that is associated with a reduced or minimum output of the HVAC system can be used to reduce power consumption by the HVAC system and allow for a greater amount of charging capacity to be used for charging a battery system. In such instances, the initial phase can be used to more quickly charge the battery system through a reduction in preconditioning, e.g., if there are limitations in charging due to the capabilities of an external charging system and/or due to the time available prior to operation/departure. In such scenarios, if a battery system reaches a desired charge (e.g., such as at least 50%, 60%, 70%, 80%, or at least 90% charge, or 100% charge), then one or more subsequent phases that are associated with a higher or maximum output of the HVAC system can be used to help reach a desired temperature or temperature range, if needed, provided that the desired temperature or temperature range is achieved without affecting range of the vehicle. For example, if 80% charge is desired, and the battery is charged to 80% but preconditioning requires additional energy, then said energy may come from a balance between charging and use of the battery energy such that the battery has the desired charge level of 80% at the departure time, and the cabin is preconditioned to the desired temperature or temperature range.

In some embodiments, a method of preconditioning an electric vehicle includes receiving, at a control system associated with the electric vehicle (e.g., such as an electric central powertrain controller ("eCPC")), an ambient temperature associated with the location of the electric vehicle, and based on the obtained ambient temperature, sending, from the control system, an override request to the HVAC system. Upon overriding the HVAC system, the method includes initiating, by the control system, a cabin preconditioning phase. In some aspects, the cabin preconditioning phase comprises: sending, from the control system, a set of cabin preconditioning commands to the HVAC system to modulate/change the cabin atmosphere based on the received ambient temperature, and a desired cabin temperature or temperature range at a time of departure. The desired temperature or temperature range may be set by an operator of the vehicle, may be automatically set (e.g., based on a lookup table stored at a controller of the vehicle), by a fleet controller (e.g., remotely set by an operator of a fleet of vehicles), etc. In embodiments, the preconditioning routine may not rely on climate control setting(s) active (or inactive) just prior to the charging event and/or preconditioning routine. In other words, the current HVAC system settings may be overridden in order to conduct a preconditioning routine. In some aspects, the method also includes receiving, at the control system, an estimated departure time for the electric vehicle, and the cabin preconditioning phase is initiated a pre-determined time prior to the estimated departure time, e.g., so that the preconditioning can produce a desired temperature or temperature range within the cabin by the estimated departure time, and a desired battery charge level can also be reached, so as to not adversely affect range of the vehicle. In some embodiments, the cabin preconditioning phase includes at least an initial phase and a final phase, and at least some of the set of cabin preconditioning commands differ in the initial phase and the final phase. The set of cabin preconditioning commands to the HVAC system to modulate the cabin atmosphere based on the received ambient temperature may include commands to change or adjust one or more of an outlet temperature, a blower speed, a blower mode, a recirculation mode, and an air-conditioning mode. In some embodiments, the cabin preconditioning phase is initiated only when the electric vehicle is in a charging mode. In some embodiments, the vehicle may be in an OFF state during the charging and preconditioning. In some embodiments, the vehicle may be in an ON state during the charging and preconditioning. In some embodiments, a controller of the vehicle may be in a sleep state, and may be woken to an ON state at some pre-determined time, to conduct the preconditioning routine. In embodiments, the vehicle may be woken to an ON state to conduct one or more other vehicle diagnostic routines, in addition to conducting the preconditioning routine. Further, in some embodiments, the preconditioning phase is terminated upon detection, by the control system, of any operator interaction with the HVAC system or if the electric vehicle is started or otherwise operated. In some embodiments, the method includes presenting, on a human-machine interface (hereinafter "HMI"), an indication that the electric vehicle is in a preconditioning phase. In some embodiments, the method also includes receiving, at the control system, parameterized values for at least one of the set of cabin preconditioning commands or the estimated departure time. The parameterized values may be configurable by a user via the HMI on the electric vehicle, or may be updated via a software update for the electric vehicle. In some embodiments, a computing device is provided, having memory and one or more processors for storing and executing some or all of the method described above.

FIG. 1 depicts a schematic illustration of selected components of an electric vehicle cabin preconditioning system 100. The system 100 includes, in some embodiments, an HVAC system 102 that may be used to regulate the air within an electric vehicle cabin 104 (shown schematically) and an eCPC 106 that is operable to utilize the HVAC system 102 to precondition the cabin 104 (as further described below). The eCPC is depicted for example purposes and can be replaced with another form of control system that can operate the HVAC system and/or other components of an electric vehicle in different embodiments. The HVAC system 102 may include, in some embodiments, a cabin temperature sensor 108 that may obtain the temperature of the cabin 104 of the electric vehicle, or at least the temperature of air exiting vents 110 associated with the HVAC system 102 that transfer air to the cabin 104. The HVAC system 102 also includes a heating and/or defrosting component 112 (hereafter referred to as heating component 112) that selectively supplies heated air to the cabin 104 and an air conditioner or cooling component 114 that selectively supplies cooled air to the cabin 104. The HVAC system 102 also includes one or more blowers 116 that operate to move the heated air from the heating component 112 and/or the cooling component 114 through the vents 110 and into the cabin 104. The HVAC system 102 also typically includes a baffle 118 that can be closed to use recirculated air, or opened to use fresh air by the HVAC system 102. In some embodiments, the HVAC system 102 may also include one or more vent controls 120. In some embodiments, the vent controls 120 can be operated to direct the vents 110, and thus the air exiting the vents 110 (such as, for example, directing hot air onto the windshield and/or window of the electric vehicle when in a defrost mode). In some embodiments, the vent controls 120 are used to direct the air only to the windows and windshields (for a defrost mode) or only to the upper vents, only to the lower vents, or to distribute the air to both the upper vents and lower vents.

The HVAC system 102 can be controlled, in some embodiments, via a number of controls within the cabin 104. More specifically, in some embodiments, the cabin 104 may include an AC mode control 122 that can be selected to activate or deactivate the cooling component 114. The AC mode is typically active when cooling air, and may be active when heated air is needed (to dehumidify the air before heating). Additionally, the HVAC system 102 typically includes some type of outlet temperature control 124. The outlet temperature control 124 is used to indicate a desired temperature for cabin 104. The HVAC system 102 may also include a blower speed control 126 that may be used to increase or decrease the speed of the blowers 116, and thus the air exiting the vents 110. The controls for the HVAC system 102 may include, in some embodiments, a control 128 to toggle between recirculating the air in cabin 104 and utilizing fresh air for treatment by the heating component 112 and/or the cooling component 114. In other embodiments, the HVAC system 102 may include a defrost mode control 130. The defrost mode control 130 may be used to route heated air from heating component 112 through vents 110 that are directed towards the windows and/or windshields of the electric vehicle.

The eCPC 106 (or another type of vehicle control system if used) can communicate with the HVAC system 102. In some embodiments, the eCPC 106 communicates with the HVAC system 102 via a controller area network (CAN) bus 132. In some embodiments, the eCPC 106 includes an ambient temperature sensor 134 that obtains the ambient air temperature surrounding the electric vehicle. In other embodiments, the eCPC 106 receives the ambient air temperature from an external temperature sensor.

Figure 3:
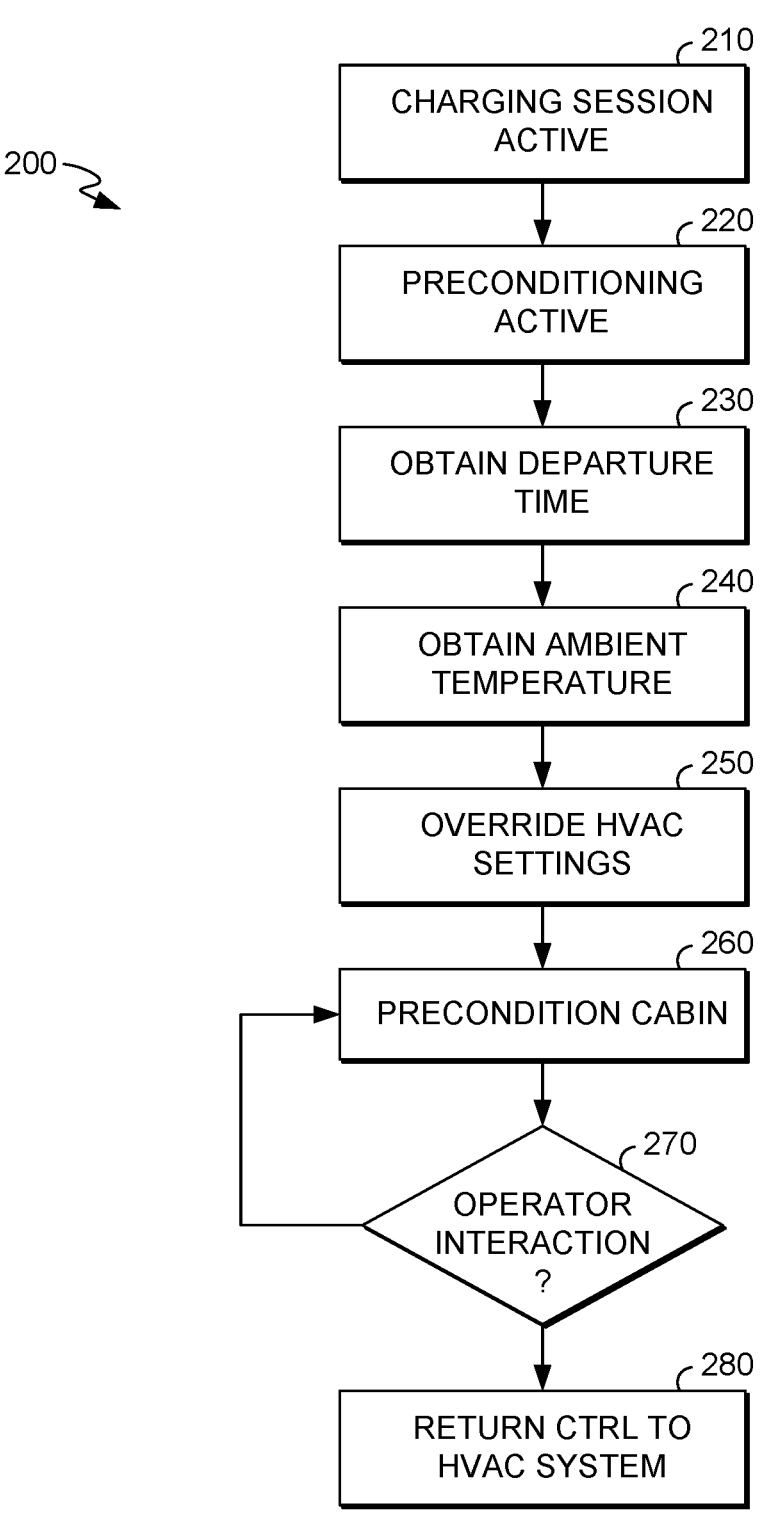
FIG. 3 depicts a block diagram of a method of preconditioning an interior/cabin of an electric vehicle, in accordance with embodiments of the present disclosure.

The eCPC 106 operates as a computing device (such as the computing device 500 described below in connection with FIG. 5). The eCPC 106 includes memory (such as memory 512) storing cabin preconditioning logic 136. The cabin preconditioning logic 136 is best understood with reference to FIGS. 3 and 4. As shown in FIG. 3, the cabin preconditioning logic 136 can execute a method 200 for preconditioning the electric vehicle cabin 104. The method 200, in some embodiments, begins by determining whether the electric vehicle is in a charging mode, as shown at block 210. This determination can help ensure that preconditioning of the cab of the electric vehicle will not negatively affect the charge of the batteries on-board the electric vehicle (such that power from the charging station is used to precondition the cab of the electric vehicle). As battery technology improves, it may not be necessary to activate the preconditioning only when the vehicle is in a charging mode. As shown at block 220, the method 200 also determines whether cabin preconditioning is enabled. In some embodiments, cabin preconditioning may be deactivated (such as when vehicles are stored in a climate controlled environment, or are only used in temperate climates, or as desired by the owner/operator of the electric vehicle). The method 200 continues, in some embodiments, by obtaining a departure time for the electric vehicle, as shown at block 230. In some embodiments, the departure time may be set by the operator of the electric vehicle, a vehicle dispatcher, or other user knowledgeable about the use of the electric vehicle, or by a computing device local or remote to the electric vehicle (e.g., such as a fleet management system that communicates with multiple electric vehicles). In other embodiments, the departure time obtained at block 230 may be ascertained from an established pattern of vehicle use, such as by using artificial intelligence to estimate the likely vehicle departure time. The method 200 also includes obtaining the ambient temperature surrounding the electric vehicle, as shown at block 240 (and may be obtained by the eCPC 106, in some embodiments, from ambient temperature sensor 134). At a predetermined time prior to the departure time of the electric vehicle, the method 200 continues by overriding the HVAC settings, as shown at block 250. To override the HVAC settings, the eCPC 106 may send a request to the HVAC system 102 via the CAN bus 132, requesting override permission by the eCPC 106 from the HVAC system 102. The HVAC system 102 can similarly send a response back to the eCPC 106 authorizing the eCPC 106 to override the HVAC system 102 settings. This allows the eCPC 106 to further implement logic 136 and to assume control over the settings associated with the heating component 112, the cooling component 114, the blowers 116, the recirculation baffle 118 and the vent controls 120, to precondition the cabin 104, as shown at block 260. The cabin preconditioning of block 260 is described further below, with respect to FIG. 4. As shown in FIG. 3, once the cabin preconditioning of block 260 is underway, the method 200 enters a loop to determine whether a user or operator of the vehicle has interacted with the vehicle, as shown in decision cell 270. If there has been no operator interaction, the preconditioning of block 260 continues. However, if it is determined at cell 270 that the operator has interacted with the electric vehicle, the method 200 returns control of the HVAC system 102 to the HVAC system 102, as shown at block 280. In some embodiments, the operator interaction determined by cell 270 could be when the operator starts the electric vehicle. In other embodiments, the operator interaction determined by cell 270 could be when the operator interacts with any of the HVAC system 102 controls (such as, for example, the vent controls 120, the AC mode control 122, the outlet temperature control 124, the blower speed control 126, the air recirculation toggle 128, or the defrost mode control 130).

Figure 4:
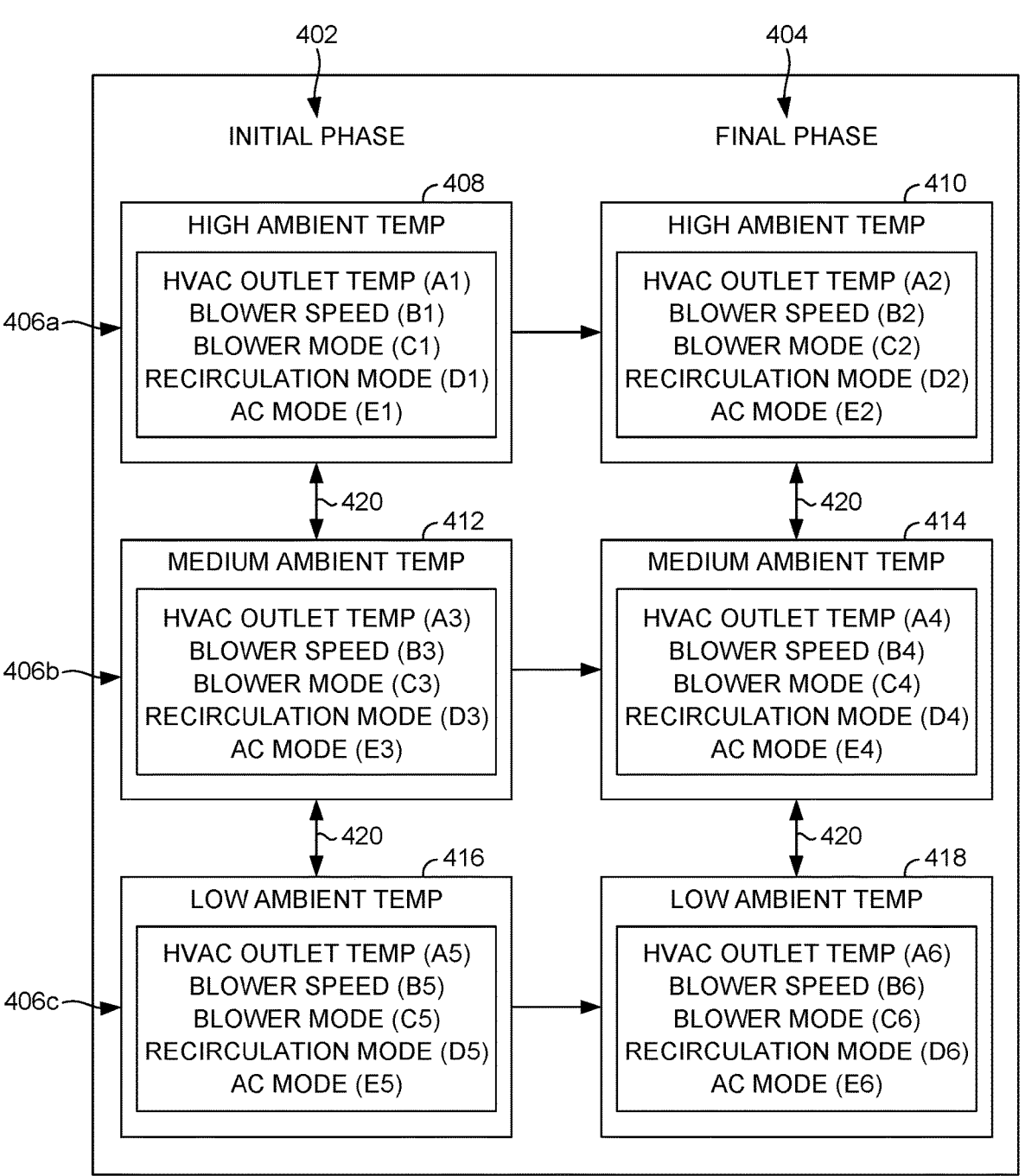
FIG. 4 depicts one example implementation of the method of FIG. 3 based on certain time and ambient temperature parameters, in accordance with embodiments of the present disclosure.

FIG. 4 depicts one embodiment of the cabin preconditioning logic 136. As shown in FIG. 4, the preconditioning logic may be divided into a number of time-based phases, shown in FIG. 4 as an initial phase 402 and a final phase 404. It should be understood, however, that other time-based phases could also be used (such as an intermediate phase between the initial phase 402 and final phase 404, or utilizing only one phase). In some embodiments, the initial phase begins at a predetermined time prior to the estimated departure time (such as that determined at block 230). In one embodiment, the initial phase could be initiated at a time greater than forty-five minutes prior to the estimated departure time, and in some embodiments, could be initiated one hour prior to the estimated departure time. At a different time prior to the estimated departure time, the preconditioning logic may move from the initial phase 402 to the final phase 404. In one embodiment, the transition time from the initial phase 402 to the final phase 404 may be forty-five minutes prior to the estimated departure time. It should be understood that other transition times could also be used, and that the transition time could be parameterized, allowing adjustment by a user or operator.

Each of the initial phase 402 and the final phase 404 (and/or other phases therebetween) may define output parameters for the HVAC system 102, and these parameters may be based upon the ambient temperature surrounding the electric vehicle (such as that determined by the ambient temperature sensor 134, or obtained from an external source). In some embodiments, each of the initial phase 402 and the final phase 404 are divided into temperature bands 406 based upon the ambient temperature (shown as temperature bands 406a, 406b and 406c in FIG. 4). Based on the phase (initial phase 402 or final phase 404), and the temperature band (406a, 406b or 406c), a different set of values for the preconditioning commands are sent from the eCPC 106 to the HVAC system 102.

Box 408 depicts one embodiment of the initial phase 402 for an electric vehicle in a high ambient temperature location, shown as temperature band 406a. In some embodiments, this high temperature band 406a could be defined as ambient temperatures greater than 25° Celsius (C) (or 77° Fahrenheit (F)). In the initial phase 402, and in temperature band 406a, the cabin precondition logic 136, in some embodiments, could output values to be sent from the eCPC 106 to the HVAC system 102. For box 408, the values for the HVAC outlet temperature, blower speed, blower mode, recirculation mode and AC mode are shown as variables A1, B1, C1, D1 and E1, respectively. In some embodiments, for box 408, HVAC outlet temperature (A1) could be set at equal to or less than 14° C. (for example, A1 could be set at 15° C.), blower speed (B1) could be set to full (or 100%), blower mode (C1) could be set to Panel/Bi-level, recirculation mode (D1) could be set to Recirculation (or recirculation 100%) and AC Mode (E1) could be set to Comfort (or AC mode on). At the transition time, the preconditioning logic 136 moves from the initial phase 402 to the final phase 404. In the high ambient temperature band 406a, the values for the final phase 404 are shown in box 410. For box 410, the values for the HVAC outlet temperature, blower speed, blower mode, recirculation mode and AC mode are shown as variables A2, B2, C2, D2 and E2, respectively. In some embodiments, for box 410, HVAC outlet temperature (A2) could be set at equal to or less than 15° C. (for example, A2 could be set at 15° C.), blower speed (B1) could be set to 65%, blower mode (C1) could be set to Panel/Bi-level, recirculation mode (D1) could be set to fresh air (or recirculation 0%) and AC Mode (E1) could be set to Comfort (or AC mode on). Note that the values need not necessarily change when moving from the initial phase 402 to the final phase 404.

Box 412 depicts one embodiment of the initial phase 402 for an electric vehicle in a medium ambient temperature location, shown as temperature band 406b. In some embodiments, this medium temperature band 406b could be defined as ambient temperatures between 0-25° C. (or between 32-77° F.). In the initial phase 402, and in temperature band 406b, the cabin precondition logic 136, in some embodiments, could output values to be sent to the HVAC system 102. For box 412, the values for the HVAC outlet temperature, blower speed, blower mode, recirculation mode and AC mode are shown as variables A3, B3, C3, D3 and E3, respectively. In some embodiments, for box 412, HVAC outlet temperature (A3) could be set between 15-30° C. (for example, A3 could be set at 25° C.), blower speed (B3) could be set to full (or 100%), blower mode (C3) could be set to Panel/Bi-level, recirculation mode (D3) could be set to Recirculation (or recirculation 100%) and AC Mode (E3) could be set to not active (or AC mode off). At the transition time, the preconditioning logic 136 moves from the initial phase 402 to the final phase 404. In the medium ambient temperature band 406b, the values for the final phase are shown in box 414. For box 414, the values for the HVAC outlet temperature, blower speed, blower mode, recirculation mode and AC mode are shown as variables A4, B4, C4, D4 and E4, respectively. In some embodiments, for box 414, HVAC outlet temperature (A4) could be set between 15-30° C. (for example, A4 could be set at 20° C.), blower speed (B4) could be set to 65%, blower mode (C4) could be set to Panel/Bi-level, recirculation mode (D4) could be set to fresh air (or recirculation 0%) and AC Mode (E4) could be set to not active (or AC mode off).

Box 416 depicts one embodiment of the initial phase 402 for an electric vehicle in a low ambient temperature location, shown as temperature band 406c. In some embodiments, this low temperature band 406c could be defined as ambient temperatures below 0° C. (or below 32° F.). In the initial phase 402, and in temperature band 406c, the cabin precondition logic 136, in some embodiments, could output values to be sent to the HVAC system 102. For box 416, the values for the HVAC outlet temperature, blower speed, blower mode, recirculation mode and AC mode are shown as variables A5, B5, C5, D5 and E5, respectively. In some embodiments, for box 416, HVAC outlet temperature (A5) could be set above 30° C. (for example, A5 could be set at 35° C.), blower speed (B5) could be set to full (or 100%), blower mode (C5) could be set to Defrost, recirculation mode (D5) could be set to Recirculation (or recirculation 100%) and AC Mode (E5) could be set to comfort (or AC mode on). At the transition time, the preconditioning logic 136 moves from the initial phase 402 to the final phase 404. In the low ambient temperature band 406c, the values for the final phase 404 are shown in box 418. For box 418, the values for the HVAC outlet temperature, blower speed, blower mode, recirculation mode and AC mode are shown as variables A6, B6, C6, D6 and E6, respectively. In some embodiments, for box 418, HVAC outlet temperature (A6) could be set at or above 30° C. (for example, A6 could be set at 30° C.), blower speed (B6) could be set to 65%, blower mode (C6) could be set to Defrost, recirculation mode (D6) could be set to fresh air (or recirculation 0%) and AC Mode (E6) could be set to comfort (or AC mode on).

Figure 2:
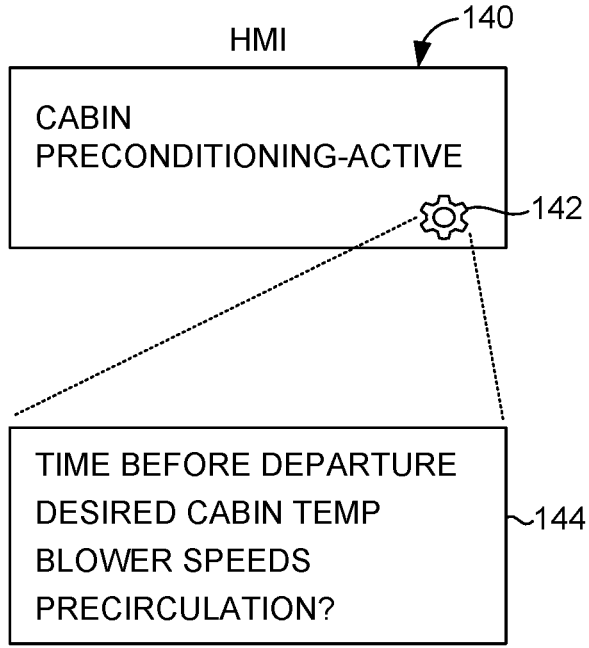
FIG. 2 depicts a schematic view of a human-machine interface, in accordance with embodiments of the present disclosure.

The settings for some, or all, of the values given above with respect to FIG. 4 are merely one example of the values that could be set for the HVAC outlet temperature, blower speed, blower mode, recirculation mode, and AC mode. Additionally, as the ambient temperature changes, the preconditioning logic 136 could move from one temperature band 406 to another, as indicated by arrows 420 in FIG. 4. In some embodiments, the values for the HVAC outlet temperature, blower speed, blower mode, recirculation mode and AC mode in each temperature band 406 and in either or both of the initial phase 402 or the final phase 404 can be stored in a look-up table (such as in memory 512 described in connection with FIG. 5 below) and accessed by the preconditioning logic 136. In other embodiments, the values for the HVAC outlet temperature, blower speed, blower mode, recirculation mode and AC mode, as well as parameters defining the timing for the initial phase 402 and the final phase 404 may be configured by a technician, or a user or operator of the electric vehicle. In some embodiments, as shown in FIG. 2, the electric vehicle may include a human-machine interface (HMI) 140 that presents an indication within the electric vehicle that the cabin preconditioning is active. Other indicia could also be presented within the electric vehicle to inform a user or operator that the cabin preconditioning is active. Additionally, the HMI 140 may include a settings button 142 or user interface 144 that allows the cabin preconditioning parameters to be adjusted (such as, for example, the estimated time of departure, HVAC outlet temperature (the desired cabin temperature), blower speed, blower mode, recirculation mode and AC mode, as well as parameters defining the timing for the initial phase 402 and the final phase 404).

Using the cabin preconditioning system 100, the cabin atmosphere can be modulated by adjusting the cabin temperature such that the cabin is ready for comfortable use by an operator at the departure time. In low ambient temperature environments, the cabin preconditioning system 100 can be used to ensure that the windows and windshields are clear of any frost, ice, or snow. The cabin preconditioning logic 136 can be modified as needed or desired. Additionally, some or all of the preconditioning parameters can be modified or adjusted for one or more of the phases and/or temperature bands. This allows the preconditioning system 100 to be customized for individuals, or set by a fleet manager, for example.

Figure 5:
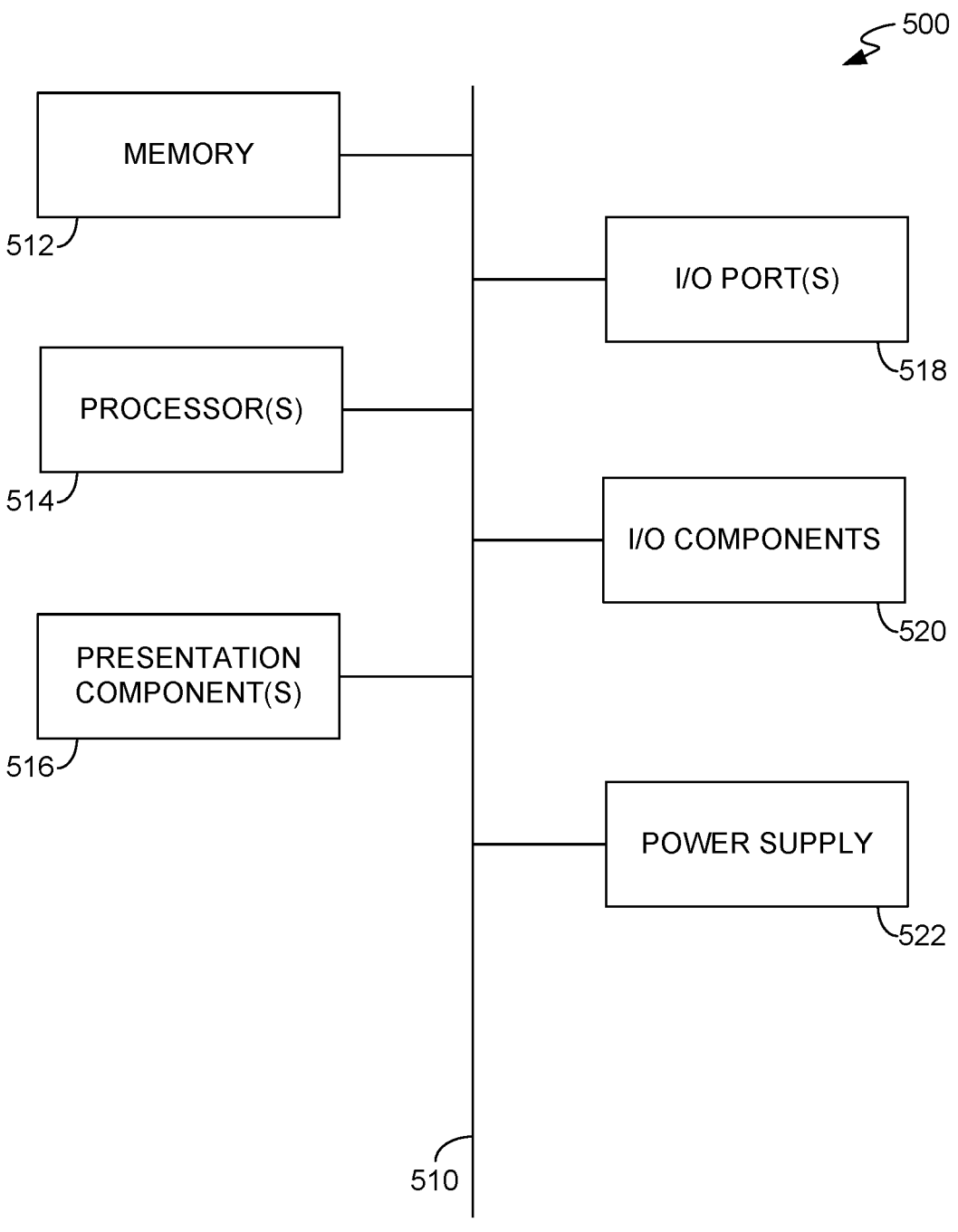
FIG. 5 depicts an example computing device, in accordance with embodiments of the present disclosure.

Looking now at FIG. 5, an example operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The subject matter herein may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like refer to code that performs particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. In some embodiments, some I/O ports may be linked to wired or wireless communications. Bus 510 represents what may be one or more busses (such CAN bus 132, or such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. FIG. 5 is merely illustrative of an example computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, Compact Disc Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Memory 512 includes computer storage media in the form of volatile and/or nonvolatile memory and may include memory containing the cabin preconditioning logic 136. The memory may be removable, non-removable, or a combination thereof. Exemplary hardware devices include solid-state memory, hard drives, optical-disc drives, etc. Computing device 500 includes one or more processors that read data from various entities such as memory 512, or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Figure 6:
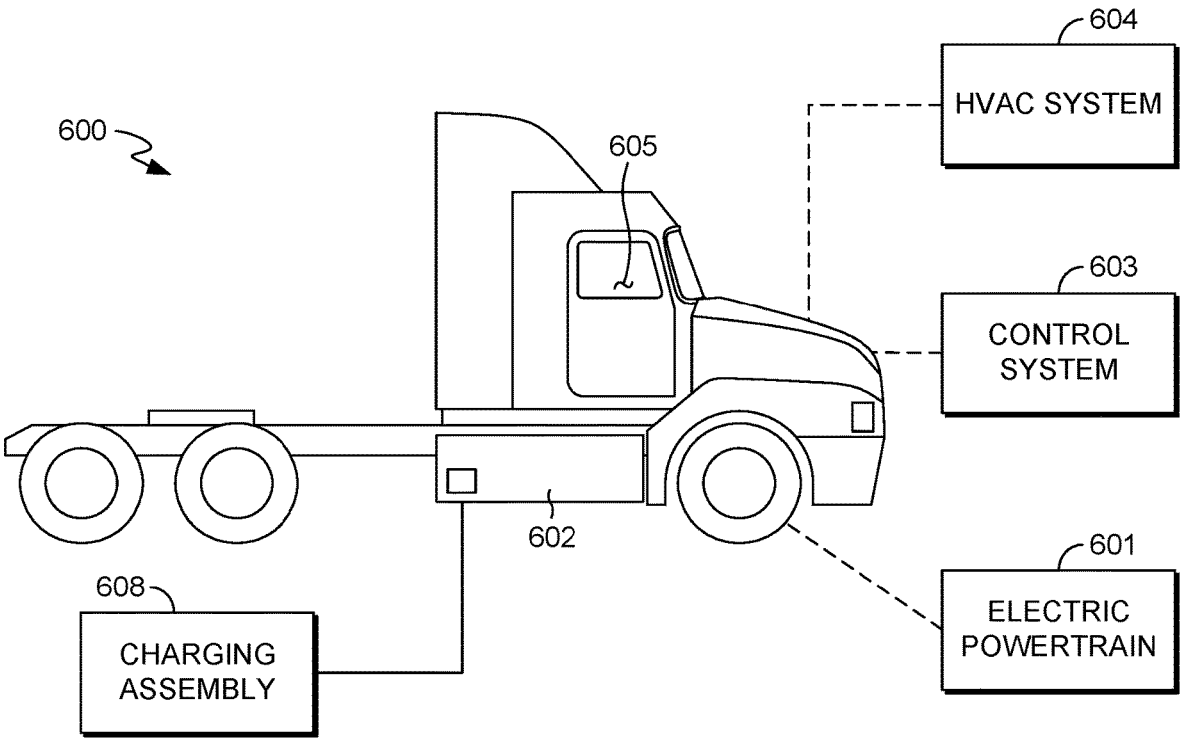
FIG. 6 depicts one example of an electric vehicle, in accordance with embodiments of the present disclosure.

FIG. 6 depicts an example of a vehicle 600 in which embodiments described herein can be implemented and used. The vehicle 600 depicted in FIG. 6 is an electric vehicle, and in particular, is an electric freight tractor. However, numerous other types of vehicles are contemplated herein. The vehicle 600 includes an electric powertrain 601 (identified generically due to being located inside the vehicle 600), a battery system 602, a control system 603 (also depicted generically), an HVAC system 604 (also depicted generically), and an interior/cabin 605. The control system 603 can be configured to override one or more settings of the HVAC system 604 to precondition the interior/cabin 605 of the vehicle 600 to a desired temperature or temperature range, e.g., by a designated time of operation/departure of the vehicle 600. FIG. 6 also depicts a charging assembly 608 that can be attached to the battery system 602 to perform one or more types of charging (e.g., slow, medium, or fast charging). The control system 603 can be configured to adjust the HVAC system 604 output based on a rate of battery charging to maximize preconditioning, maximize charging, or a balance of both, in accordance with embodiments contemplated herein.

Figure 7:
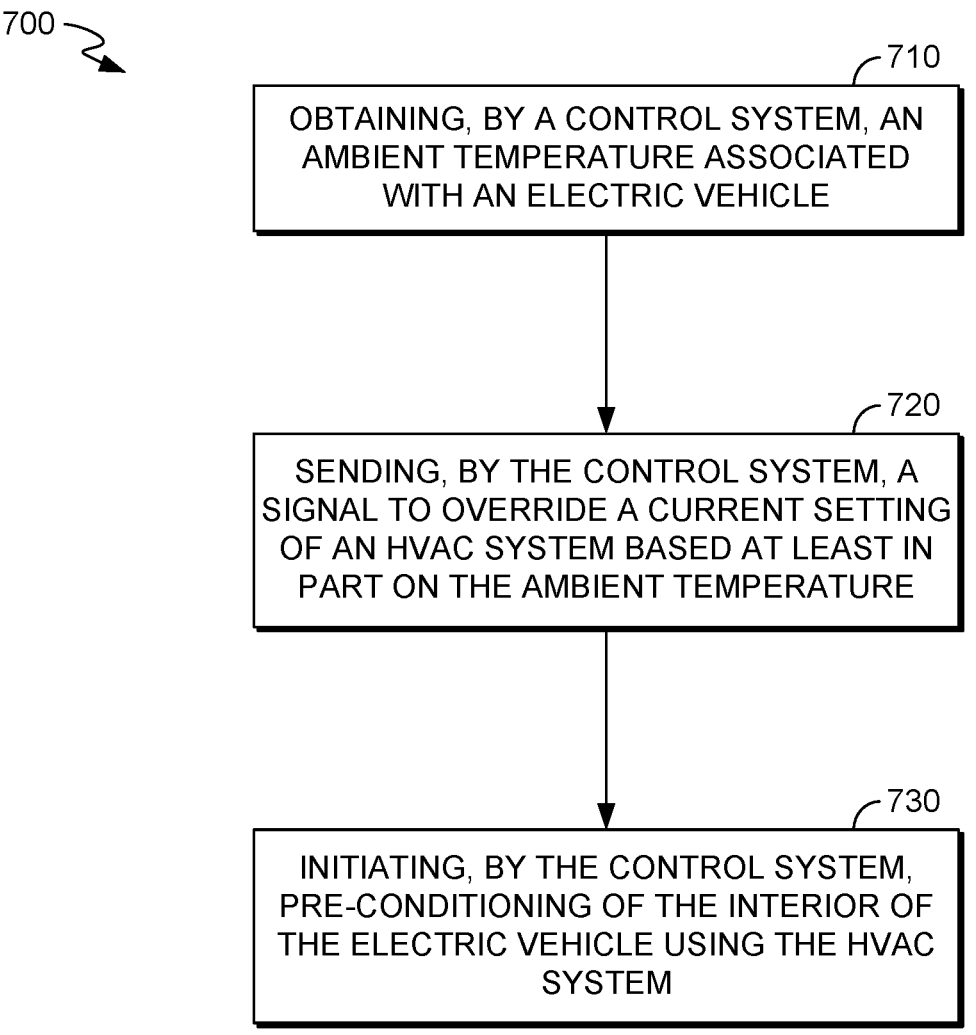
FIG. 7 depicts a block diagram of a method of preconditioning an electric vehicle, in accordance with embodiments of the present disclosure.

FIG. 7 depicts a block diagram of an example method 700 of preconditioning an electric vehicle, in accordance with embodiments of the present disclosure. The method 700 includes blocks 710-730 but is not limited to this selection of elements, or the order depicted. In block 710, the method 700 includes obtaining, by a control system, such as the control system 603 shown in FIG. 6, an ambient temperature associated with an electric vehicle, e.g., such as the electric vehicle 600 shown in FIG. 6. In block 720, the method 700 includes sending, by the control system, a signal to override a current setting of an HVAC system, e.g., such as the HVAC system 604 shown in FIG. 6, based at least in part on the ambient temperature (e.g., interior temperature and/or exterior temperature). In block 730, the method 700 includes initiating, by the control system, preconditioning of the interior of the electric vehicle using the HVAC system.

Figure 8:
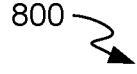
FIG. 8 depicts a block diagram of a method of reconfiguring an electric vehicle for preconditioning, in accordance with embodiments of the present disclosure.

FIG. 8 depicts a block diagram of an example method 800 of re-configuring an electric vehicle for preconditioning, in accordance with embodiments of the present disclosure. The method 800 includes block 810 but other elements are contemplated herein. In block 810, the method 800 includes configuring a control system, e.g., such as the control system 603 shown in FIG. 6, to receive an indication of a departure time, e.g., through a communication signal or a HMI input, and send a signal to an HVAC system, e.g., such as the HVAC system 604 shown in FIG. 6, to override a current setting of the HVAC system based at least in part on the indication of the departure time, and operate the HVAC system to precondition an interior, e.g., the interior 605 shown in FIG. 6, to a desired temperature or temperature range by the departure time.

The subject matter of the present disclosure can be implemented in vehicles that use different types of powertrains. For example, this can include electric vehicles, e.g., such as a battery electric vehicle ("BEV"), a hybrid electric vehicle ("HEV"), a plug-in hybrid electric vehicle ("PHEV"), and can include vehicles that operate using internal combustion (e.g., gasoline-based or diesel-based internal combustion engines).

The subject matter of the present disclosure can also be implemented in different types of vehicles, e.g., passenger cars, or trucks, including light, medium, and/or heavy duty trucks (e.g., class 1-8 commercial trucks), and other commercial or industrial vehicles and equipment.

The following clauses represent example embodiments and example combinations thereof and are intended to be non-limiting in nature. In this sense, any of the following clauses may be combined in a multiple dependent manner to depend from one or more other clauses. Further, any combination of dependent clauses (clauses that explicitly depend from a previous clause) may be combined while staying within the scope of the present disclosure.

Clause 1. A method of preconditioning a cabin of an electric vehicle having a heating, ventilation, and air-conditioning (HVAC) system, the method comprising: receiving, at an electric central powertrain controller (eCPC), an ambient temperature associated with the location of the electric vehicle; and based on the obtained ambient temperature, sending, from the eCPC, an override request to the HVAC system; upon overriding the HVAC system, initiating, by the eCPC, a cabin preconditioning phase.

Clause 2. The method of clause 1, wherein the cabin preconditioning phase comprises: sending, from the eCPC, a set of cabin preconditioning commands to the HVAC system to modulate the cabin atmosphere based on the received ambient temperature.

Clause 3. The method of any of clauses 1-2, further comprising: receiving, at the eCPC, an estimated departure time for the electric vehicle, and wherein the cabin preconditioning phase is initiated a predetermined time prior to the estimated departure time.

Clause 4. The method of any of clauses 1-3, wherein the cabin preconditioning phase includes at least an initial phase and a final phase, and wherein at least some of the set of cabin preconditioning commands to the HVAC system to modulate the cabin atmosphere based on the received ambient temperature differ in the initial phase from the final phase.

Clause 5. The method of any of clauses 1-4, wherein the set of cabin preconditioning commands to the HVAC system to modulate the cabin atmosphere based on the received ambient temperature include commands to modulate one or more of an outlet temperature, a blower speed, a blower mode, a recirculation mode and an air-conditioning mode.

Clause 6. The method of any of clauses 1-5, wherein the cabin preconditioning phase is initiated only when the electric vehicle is in a charging mode.

Clause 7. The method of any of clauses 1-6, wherein the preconditioning phase is terminated upon detection, by the eCPC, of any operator interaction with the HVAC system.

Clause 8. The method of any of clauses 1-7, further comprising presenting, on a human-machine interface (HMI), an indication that the electric vehicle is in a preconditioning phase.

Clause 9. The method of any of clauses 1-8, further comprising: receiving, at the eCPC, parameterized values for at least one of the set of cabin preconditioning commands or the estimated departure time.

Clause 10. The method of any of clauses 1-9, wherein the parameterized values are configurable by a user via the HMI.

Clause 11. A computing device associated with an electric vehicle having a heating, ventilation, and air-conditioning (HVAC) system, the computing device comprising: a memory configured to store instructions; and one or more processors coupled to the memory and configured to execute instructions stored in the memory to execute a vehicle cabin preconditioning service, wherein the preconditioning service is configured to: receive an ambient temperature associated with the location of the electric vehicle; send an override request to the HVAC system; and upon overriding the HVAC system, initiate a cabin preconditioning phase.

Clause 12. The computing device of clause 11, wherein the cabin preconditioning phase includes sending a set of cabin preconditioning commands to the HVAC system to modulate the cabin atmosphere based on the received ambient temperature.

Clause 13. The computing device of any of clauses 11-12, wherein the cabin preconditioning service includes instructions for: receiving an estimated departure time for the electric vehicle; and initiating the cabin preconditioning phase at a predetermined time prior to the estimated departure time.

Clause 14. The computing device of any of clauses 11-13, wherein the cabin preconditioning phase comprises instructions for: an initial phase; and a final phase, and wherein the set of cabin preconditioning commands to the HVAC system to modulate the cabin atmosphere based on the received ambient temperature differ in the initial phase from the final phase.

Clause 15. The computing device of any of clauses 11-14, wherein the set of cabin preconditioning commands to the HVAC system to modulate the cabin atmosphere based on the received ambient temperature include commands to modulate one or more of an outlet temperature, a blower speed, a blower mode, a recirculation mode and an air-conditioning mode.

Clause 16. The computing device of any of clauses 11-15, wherein the cabin preconditioning service includes instructions for: receiving an indication of the electric vehicle charging status, and executing the vehicle cabin preconditioning service only if the electric vehicle is in a charging mode.

Clause 17. The computing device of any of clauses 11-16, wherein the cabin preconditioning service includes instructions for: receiving an indication of any operator interaction with the HVAC system or a start of the electric vehicle; and terminating the cabin preconditioning service upon receipt of an indication of any operator interaction with the HVAC system or a start of the electric vehicle.

Clause 18. The computing device of any of clauses 11-17, wherein the instructions stored in the memory to execute the vehicle cabin preconditioning service, further comprise instructions to present, on a human-machine interface (HMI) within the electric vehicle, an indication that the electric vehicle is in a preconditioning phase.

Clause 19. The computing device of any of clauses 11-18, wherein the instructions stored in the memory to execute the vehicle cabin preconditioning service, further comprise obtaining, prior to initiating the cabin preconditioning service, parameterized values for at least one of the set of cabin preconditioning commands or the estimated departure time.

Clause 20. The computing device of any of clauses 11-19, wherein the instructions stored in the memory to execute the vehicle cabin preconditioning service, further comprise instructions to present, on the human-machine interface (HMI) within the electric vehicle, a settings display configured to allow an operator to change any of the parameterized values.

Clause 21. A method for preconditioning an interior of an electric vehicle that includes a control system and a heating, ventilation, and air-conditioning (HVAC) system, the method comprising: obtaining, by the control system, an ambient temperature associated with the electric vehicle; sending, by the control system, a signal to override a current setting of the HVAC system based at least in part on the ambient temperature; and initiating, by the control system, preconditioning of the interior of the electric vehicle using the HVAC system Clause 22. The method of clause 21, wherein the electric vehicle comprises a battery system, and wherein the preconditioning is initiated during charging of the battery system.

Clause 23. The method of clause 21 or 22, further comprising receiving, by the control system, a departure time, wherein the preconditioning is initiated by the control system based at least in part on the departure time.

Clause 24. The method of any of clauses 21-23, further comprising receiving, by the control system, a departure time, wherein the preconditioning is initiated by the control system based on a time required for the HVAC system to produce a desired temperature or temperature range in the interior and the departure time.

Clause 25. The method of any of clauses 21-24, further comprising: receiving, by the control system, a departure time; receiving, by the control system, a rate of battery charging; and adjusting a rate of heat transfer provided by the HVAC system based on the rate of battery charging and the departure time.

Clause 26. The method of any of clauses 21-25, wherein adjusting the rate of heat transfer provided by the HVAC system comprises reducing a power consumption of the HVAC system to increase the rate of battery charging.

Clause 27. The method of any of clauses 21-26, further comprising: receiving, by the control system, an updated departure time; and increasing the rate of heat transfer provided by the HVAC system based on the updated departure time and the rate of battery charging.

Clause 28. The method of any of clauses 21-27, further comprising: preconditioning in a first phase where a first output from the HVAC system is provided for a first period of time; and preconditioning in a second phase where a second output from the HVAC system is provided for a second period of time.

Clause 29. The method of any of clauses 21-28, wherein the first output has a higher power consumption and produces a higher rate of heat transfer, and wherein the second output has a lower power consumption and produces a lower rate of heat transfer.

Clause 30. The method of any of clauses 21-29, wherein the first output has a lower power consumption and produces a lower rate of heat transfer, and wherein the second output has a higher power consumption and produces a higher rate of heat transfer.

Clause 31. An electric vehicle, comprising: a battery system; a heating, ventilation, and air-conditioning (HVAC) system; and a control system connected to the HVAC system, wherein the control system is configured to: obtain an ambient temperature associated with the electric vehicle, based on the obtained ambient temperature, override one or more settings of the HVAC system, and initiate preconditioning of an interior of the electric vehicle using the HVAC system.

Clause 32. The electric vehicle of clause 31, wherein the control system is configured to initiate the preconditioning during charging of the battery system.

Clause 33. The electric vehicle of clause 31 or 32, wherein the control system is configured to receive a departure time and initiate the preconditioning based at least in part on the departure time Clause 34. The electric vehicle of any of clauses 31-33, wherein the control system is configured to receive a departure time, and wherein the control system is configured to initiate the preconditioning based on a time required for the HVAC system to produce a desired temperature or temperature range in the interior and the departure time.

Clause 35. The electric vehicle of any of clauses 31-34, wherein the control system is further configured to: receive a departure time, receive a rate of battery charging, and adjust a rate of heat transfer provided by the HVAC system based on the rate of battery charging and the departure time.

Clause 36. The electric vehicle of any of clauses 31-35, wherein adjusting the rate of heat transfer provided by the HVAC system comprises reducing a power consumption of the HVAC system to increase the rate of battery charging.

Clause 37. The electric vehicle of any of clauses 31-36, wherein the control system is further configured to: precondition in a first phase where a first output from the HVAC system is provided for a first period of time; and precondition in a second phase where a second output from the HVAC system is provided for a second period of time.

Clause 38. The electric vehicle of any of clauses 31-37, wherein the first output has a higher power consumption and produces a higher rate of heat transfer, and wherein the second output has a lower power consumption and produces a lower rate of heat transfer.

Clause 39. The electric vehicle of any of clauses 31-38, wherein the first output has a lower power consumption and produces a lower rate of heat transfer, and wherein the second output has a higher power consumption and produces a higher rate of heat transfer.

Clause 40. A method for re-configuring an electric vehicle for preconditioning, the electric vehicle comprising an interior, a control system, and a heating, ventilation, and air-conditioning (HVAC) system, the method comprising: configuring the control system to: receive an indication of a departure time; send a signal to the HVAC system to override a current setting of the HVAC system based at least in part on the indication of the departure time; and operate the HVAC system to precondition the interior to a desired temperature or temperature range by the departure time.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. In this sense, alternative embodiments will become apparent to those of ordinary skill in the art to which the present subject matter pertains without departing from the scope hereof. In addition, different combinations and sub-combinations of elements disclosed, as well as use and inclusion of elements not shown, are possible and contemplated as well.

What is claimed is:

1. A method for preconditioning an interior of an electric vehicle that includes a control system and a heating, ventilation, and air-conditioning (HVAC) system, the method comprising:
   obtaining, by the control system, an ambient temperature associated with the electric vehicle;
   sending, by the control system, a signal to override a current setting of the HVAC system based at least in part on the ambient temperature; and
   initiating, by the control system, preconditioning of the interior of the electric vehicle using the HVAC system, wherein the preconditioning includes:
      a first phase having a first set of HVAC settings where a first output from the HVAC system is provided for a first period of time; and
      a second phase having a second set of HVAC settings where a second output from the HVAC system is provided for a second period of time;
      wherein the first phase is selected from a plurality of first phase preconditioning options based on the ambient temperature corresponding to a temperature band of the first phase, wherein each of the plurality of first phase preconditioning options corresponds to different ones of a plurality of temperature bands, and wherein each of the plurality of first phase preconditioning options has different values for one or more of the first set of HVAC settings.

2. The method of claim 1, wherein the electric vehicle comprises a battery system, and wherein the preconditioning is initiated during charging of the battery system.

3. The method of claim 2, further comprising receiving, by the control system, a departure time, wherein the preconditioning is initiated by the control system based at least in part on the departure time.

4. The method of claim 2, further comprising receiving, by the control system, a departure time, wherein the preconditioning is initiated by the control system based on a time required for the HVAC system to produce a desired temperature or temperature range in the interior and the departure time.

5. The method of claim 2, further comprising:
   receiving, by the control system, a departure time;
   receiving, by the control system, a rate of battery charging; and
   adjusting a rate of heat transfer provided by the HVAC system based on the rate of battery charging and the departure time.

6. The method of claim 5, wherein adjusting the rate of heat transfer provided by the HVAC system comprises reducing a power consumption of the HVAC system to increase the rate of battery charging.

7. The method of claim 5, further comprising:
   receiving, by the control system, an updated departure time; and
   increasing the rate of heat transfer provided by the HVAC system based on the updated departure time and the rate of battery charging.

8. The method of claim 1, wherein the first output has a higher power consumption and produces a higher rate of heat transfer, and wherein the second output has a lower power consumption and produces a lower rate of heat transfer.

9. The method of claim 1, wherein the first output has a lower power consumption and produces a lower rate of heat transfer, and wherein the second output has a higher power consumption and produces a higher rate of heat transfer.

10. An electric vehicle, comprising:
   a battery system;
   a heating, ventilation, and air-conditioning (HVAC) system; and
   a control system connected to the HVAC system, wherein the control system is configured to:
      obtain an ambient temperature associated with the electric vehicle;
      based on the obtained ambient temperature, override one or more settings of the HVAC system including to change a blower mode setting, wherein the blower mode setting includes one of a panel mode, a bi-level mode, and a defrost mode;
      initiate preconditioning of an interior of the electric vehicle using the HVAC system, wherein the preconditioning includes:
         a first phase where a first output from the HVAC system is provided for a first period of time; and
         a second phase where a second output from the HVAC system is provided for a second period of time; and
         wherein the first phase has a first set of HVAC settings and the second phase has a second set of HVAC settings, wherein the first phase is selected from a plurality of first phase preconditioning options based on the ambient temperature corresponding to a temperature band of the first phase, wherein each of the plurality of first phase preconditioning options corresponds to different ones of a plurality of temperature bands, and wherein each of the plurality of first phase preconditioning options has different values for one or more of the first set of HVAC settings.

11. The electric vehicle of claim 10, wherein the control system is configured to initiate the preconditioning during charging of the battery system.

12. The electric vehicle of claim 11, wherein the control system is configured to receive a departure time and initiate the preconditioning based at least in part on the departure time.

13. The electric vehicle of claim 11, wherein the control system is configured to receive a departure time, and wherein the control system is configured to initiate the preconditioning based on a time required for the HVAC system to produce a desired temperature or temperature range in the interior and the departure time.

14. The electric vehicle of claim 11, wherein the control system is further configured to:

receive a departure time, receive a rate of battery charging, and adjust a rate of heat transfer provided by the HVAC system based on the rate of battery charging and the departure time.

15. The electric vehicle of claim 14, wherein adjusting the rate of heat transfer provided by the HVAC system comprises reducing a power consumption of the HVAC system to increase the rate of battery charging.

16. The electric vehicle of claim 10, wherein the first output has a higher power consumption and produces a higher rate of heat transfer, and wherein the second output has a lower power consumption and produces a lower rate of heat transfer.

17. The electric vehicle of claim 10, wherein the first output has a lower power consumption and produces a lower rate of heat transfer, and wherein the second output has a higher power consumption and produces a higher rate of heat transfer.

18. A method for re-configuring an electric vehicle for preconditioning, the electric vehicle comprising an interior, a control system, a battery system, and a heating, ventilation, and air-conditioning (HVAC) system, the method comprising:

configuring the control system to:

receive an indication of a departure time;

obtain an ambient temperature associated with the electric vehicle;

send a signal to the HVAC system to override a current setting of the HVAC system during charging of the battery system based at least in part on the indication of the departure time and the ambient temperature; and operate the HVAC system to precondition the interior to a desired temperature or temperature range by the departure time, including to precondition in:

a first phase having a first set of HVAC settings where a first output from the HVAC system is provided for a first period of time; and a second phase having a second set of HVAC settings where a second output from the HVAC system is provided for a second period of time;

wherein the first phase is selected from a plurality of first phase preconditioning options based on the ambient temperature corresponding to a temperature band of the first phase, wherein each of the plurality of first phase preconditioning options corresponds to different ones of a plurality of temperature bands, and wherein each of the plurality of first phase preconditioning options has different values for one or more of the first set of HVAC settings.

19. The method of claim 18, wherein the first set of HVAC settings includes an first blower mode setting and a first blower speed setting, and wherein the second set of HVAC settings includes a second blower mode setting and a second blower speed setting.

20. The method of claim 1, wherein the first set of HVAC settings includes an first blower mode setting and a first blower speed setting, and wherein the second set of HVAC settings includes a second blower mode setting and a second blower speed setting.

21. The electric vehicle of claim 10, wherein to override the one or more settings of the HVAC system the control system is further configured to change the blower mode setting to the defrost mode.

* * * * *